(12) United States Patent
Takatani et al.

(10) Patent No.: US 11,855,485 B2
(45) Date of Patent: Dec. 26, 2023

(54) LAMINATED CORE, METHOD OF MANUFACTURING SAME, AND ELECTRIC MOTOR

(71) Applicant: NIPPON STEEL CORPORATION, Tokyo (JP)

(72) Inventors: Shinsuke Takatani, Tokyo (JP); Hiroyasu Fujii, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 261 days.

(21) Appl. No.: 17/297,617

(22) PCT Filed: Dec. 17, 2019

(86) PCT No.: PCT/JP2019/049312
§ 371 (c)(1),
(2) Date: May 27, 2021

(87) PCT Pub. No.: WO2020/129948
PCT Pub. Date: Jun. 25, 2020

(65) Prior Publication Data
US 2022/0029478 A1      Jan. 27, 2022

(30) Foreign Application Priority Data
Dec. 17, 2018   (JP) ................................. 2018-235868

(51) Int. Cl.
*H02K 1/12*     (2006.01)
*H02K 15/02*    (2006.01)

(52) U.S. Cl.
CPC .............. *H02K 1/12* (2013.01); *H02K 15/02* (2013.01)

(58) Field of Classification Search
CPC ......... B32B 15/18; B32B 7/14; B32B 15/043; B32B 2255/20; B32B 2307/208;
(Continued)

(56) References Cited

U.S. PATENT DOCUMENTS

| 5,142,178 A | 8/1992 | Kloster et al. |
|---|---|---|
| 5,248,405 A | 9/1993 | Kaneda et al. |

(Continued)

FOREIGN PATENT DOCUMENTS

| CN | 102792556 A | 11/2012 |
|---|---|---|
| EP | 3553799 A1 | 10/2019 |

(Continued)

OTHER PUBLICATIONS

Translation of foreign patent document JP 2012207220 A (Year: 2012).*

(Continued)

*Primary Examiner* — Alex W Mok
(74) *Attorney, Agent, or Firm* — Renner, Otto, Boisselle & Sklar, LLP

(57) ABSTRACT

A laminated core includes a plurality of electrical steel sheets which are stacked on each other and of each of which both surfaces are coated with an insulation coating; and an adhesion part which is provided between the electrical steel sheets adjacent in the stacking direction and adheres the electrical steel sheets to each other, wherein an adhesive for forming the adhesion part includes a first phase and a second phase, wherein the adhesion part has a sea-island structure of the first phase which is a sea structure portion and the second phase which is an island structure portion, wherein the first phase contains an epoxy resin, an acrylic resin, and a curing agent, wherein the first phase has an SP value of 8.5

(Continued)

to 10.7 $(cal/cm^3)^{1/2}$, wherein the second phase contains an elastomer, and wherein the second phase has an SP value of 7.5 to 8.4 $(cal/cm^3)^{1/2}$.

9 Claims, 4 Drawing Sheets

(58) Field of Classification Search
CPC .......... B32B 2307/202; B32B 2255/28; B32B 2457/00; B32B 2255/06; B32B 2250/05; B32B 2255/26; H01F 3/02; H01F 41/0233; H02K 1/12; H02K 15/02; H02K 1/18; H02K 1/04; C09J 163/00; C08L 9/00; C08L 33/06
USPC .................................................. 310/216.004
See application file for complete search history.

(56) References Cited

U.S. PATENT DOCUMENTS

| | | | |
|---|---|---|---|
| 5,338,996 A | 8/1994 | Yamamoto | |
| 5,448,119 A | 9/1995 | Kono et al. | |
| 5,994,464 A | 11/1999 | Ohsawa et al. | |
| 6,495,936 B2 | 12/2002 | Kikuchi et al. | |
| 6,653,758 B2 | 11/2003 | Tsuneyoshi et al. | |
| 7,859,163 B2 | 12/2010 | Bertocchi et al. | |
| 7,952,254 B2 | 5/2011 | Cho et al. | |
| 8,581,468 B2 | 11/2013 | Kudose et al. | |
| 8,697,811 B2 * | 4/2014 | Kishi | C09J 163/00 525/308 |
| 9,331,530 B2 | 5/2016 | Jang et al. | |
| 9,512,335 B2 * | 12/2016 | Hoshi | C09J 7/10 |
| 9,770,949 B2 * | 9/2017 | Fudemoto | B60C 5/01 |
| 10,340,754 B2 | 7/2019 | Ogino et al. | |
| 10,348,170 B2 | 7/2019 | Izumi et al. | |
| 10,491,059 B2 | 11/2019 | Murakami et al. | |
| 10,547,225 B2 | 1/2020 | Hattori et al. | |
| 10,574,112 B2 | 2/2020 | Tomonaga | |
| 10,819,201 B2 | 10/2020 | Thumm et al. | |
| 10,840,749 B2 | 11/2020 | Chaillou et al. | |
| 11,056,934 B2 | 7/2021 | Kubota et al. | |
| 11,616,407 B2 | 3/2023 | Hino et al. | |
| 2002/0047459 A1 | 4/2002 | Adaeda et al. | |
| 2004/0056556 A1 | 3/2004 | Fujita | |
| 2004/0124733 A1 | 7/2004 | Yamamoto et al. | |
| 2007/0040467 A1 | 2/2007 | Gu | |
| 2007/0182268 A1 | 8/2007 | Hashiba et al. | |
| 2009/0026873 A1 | 1/2009 | Matsuo et al. | |
| 2009/0195110 A1 | 8/2009 | Miyaki | |
| 2009/0230812 A1 | 9/2009 | Cho et al. | |
| 2010/0197830 A1 | 8/2010 | Hayakawa et al. | |
| 2010/0219714 A1 | 9/2010 | Abe et al. | |
| 2010/0244617 A1 | 9/2010 | Nobata et al. | |
| 2011/0269894 A1 | 11/2011 | Miyamoto | |
| 2012/0088096 A1 | 4/2012 | Takeda et al. | |
| 2012/0128926 A1 | 5/2012 | Ohishi et al. | |
| 2012/0288659 A1 * | 11/2012 | Hoshi | C09J 133/20 156/247 |
| 2013/0244029 A1 * | 9/2013 | Igarashi | C09J 123/02 428/355 BL |
| 2014/0023825 A1 * | 1/2014 | Igarashi | C09J 7/381 428/141 |
| 2015/0028717 A1 | 1/2015 | Luo et al. | |
| 2015/0130318 A1 * | 5/2015 | Kitada | H02K 15/03 523/466 |
| 2015/0256037 A1 | 9/2015 | Kudose | |
| 2015/0337106 A1 | 11/2015 | Kajihara | |
| 2016/0023447 A1 | 1/2016 | Shimizu | |
| 2016/0352165 A1 | 12/2016 | Fubuki | |
| 2017/0117758 A1 | 4/2017 | Nakagawa | |
| 2017/0235241 A1 * | 8/2017 | Takemori | G03G 9/091 430/108.23 |
| 2017/0342519 A1 | 11/2017 | Uesaka et al. | |
| 2018/0030292 A1 | 2/2018 | Gotou | |
| 2018/0056629 A1 | 3/2018 | Hamamura | |
| 2018/0159389 A1 | 6/2018 | Nishikawa | |
| 2018/0212482 A1 | 7/2018 | Nigo | |
| 2018/0295678 A1 | 10/2018 | Okazaki et al. | |
| 2018/0342925 A1 | 11/2018 | Horii et al. | |
| 2019/0010361 A1 | 1/2019 | Hoshi | |
| 2019/0040183 A1 | 2/2019 | Yoshida et al. | |
| 2020/0048499 A1 | 2/2020 | Andou et al. | |
| 2020/0186014 A1 | 6/2020 | Kusuyama | |
| 2021/0296975 A1 | 9/2021 | Hino et al. | |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 63-207639 A | 8/1988 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009-177895 A | 8/2009 |
| JP | 2010-004716 A | 1/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012-120299 A | 6/2012 |
| JP | 2012207220 A * | 10/2012 |
| JP | 2013-089883 A | 5/2013 |
| JP | 2013-181101 A | 9/2013 |
| JP | 2013-253153 A | 12/2013 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |

(56) References Cited

FOREIGN PATENT DOCUMENTS

| | | |
|---|---|---|
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129951 A1 | 6/2020 |

OTHER PUBLICATIONS

Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016, relevance discussed in specification.
Japanese Industrial Standard (JIS) K 7121-1987.
Japanese Industrial Standard (JIS) K 6850: 1999.
The papers of technical meetings in the Institute of Electrical Engineers of Japan,RM-92-79, 1992.
Matweb, "Plaskolite West Optix® CA-41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).
Datasheet of Nylon 6, Cast (Year: N/A, Printed Jun. 28, 2023).

* cited by examiner

LAMINATED CORE, METHOD OF MANUFACTURING SAME, AND ELECTRIC MOTOR

TECHNICAL FIELD

The present invention relates to a laminated core, a method of manufacturing the same, and an electric motor.

Priority is claimed on Japanese Patent Application No. 2018-235868, filed Dec. 17, 2018, the content of which is incorporated herein by reference.

BACKGROUND ART

In the related art, a laminated core as described in Patent Document 1 below is known. In this laminated core, electrical steel sheets adjacent in a stacking direction are adhered to each other.

CITATION LIST

Patent Document

[Patent Document 1]
Japanese Unexamined Patent Application, First Publication No. 2011-023523

SUMMARY OF THE INVENTION

Problems to be Solved by the Invention

There is room for improvement in the magnetic properties of the laminated core of the related art.

The present invention has been made in view of the above circumstances, and an object of the present invention is to improve the magnetic properties of the laminated core.

Means for Solving the Problem

To solve the above problems, the present invention proposes the following means.

(1) A first aspect of the present invention is a laminated core that includes a plurality of electrical steel sheets which are stacked on each other and of each of which both surfaces are coated with an insulation coating; and an adhesion part which is provided between the electrical steel sheets adjacent in the stacking direction and adheres the electrical steel sheets to each other, wherein an adhesive for forming the adhesion part includes a first phase and a second phase, wherein the adhesion part has a sea-island structure of the first phase which is a sea structure portion and the second phase which is an island structure portion, wherein the first phase contains an epoxy resin, an acrylic resin, and a curing agent, wherein the first phase has an SP value of 8.5 to 10.7 $(cal/cm^3)^{1/2}$, wherein the second phase contains an elastomer, and wherein the second phase has an SP value of 7.5 to 8.4 $(cal/cm^3)^{1/2}$.

(2) In the laminated core according to (1), a difference between the SP value of the first phase and the SP value of the second phase may be 0.1 to 3.0 $(cal/cm^3)^{1/2}$.

(3) In the laminated core according to (1) or (2), an amount of the first phase may be 50% by volume or more with respect to a total volume of the adhesion part.

(4) In the laminated core according to any one of (1) to (3), an amount of the epoxy resin may be 50% by volume or more with respect to a total volume of the first phase.

(5) In the laminated core according to any one of (1) to (4), an amount of the acrylic resin may be 5% to 45% by volume with respect to a total volume of the first phase.

(6) In the laminated core according to any one of (1) to (5), an amount of the curing agent may be 1% to 40% by volume with respect to a total volume of the first phase.

(7) In the laminated core according to any one of (1) to (6), the curing agent may be a novolac type phenolic resin.

(8) The laminated core according to any one of (1) to (7) may be for a stator.

(9) A second aspect of the present invention is a method of manufacturing the laminated core according to any one of (1) to (8), which includes applying an adhesive that includes a first phase containing an epoxy resin, an acrylic resin, and a curing agent and a second phase containing an elastomer to a surface of an electrical steel sheet; stacking a plurality of the electrical steel sheets; and curing the adhesive to form an adhesion part.

(10) A third aspect of the present invention is an electric motor comprising the laminated core according to any one of (1) to (8).

Effects of the Invention

According to the present invention, it is possible to improve the magnetic properties of the laminated core.

EMBODIMENTS FOR IMPLEMENTING THE INVENTION

Hereinafter, a laminated core according to an embodiment of the present invention and an electric motor including the laminated core will be described with reference to the drawings. In the present embodiment, a motor, specifically, an AC motor, more specifically, a synchronous motor, and further more specifically, a permanent magnetic electric motor will be described as an example of the electric motor. This type of motor is suitably employed for, for example, an electric vehicle and the like.

Figure 1:
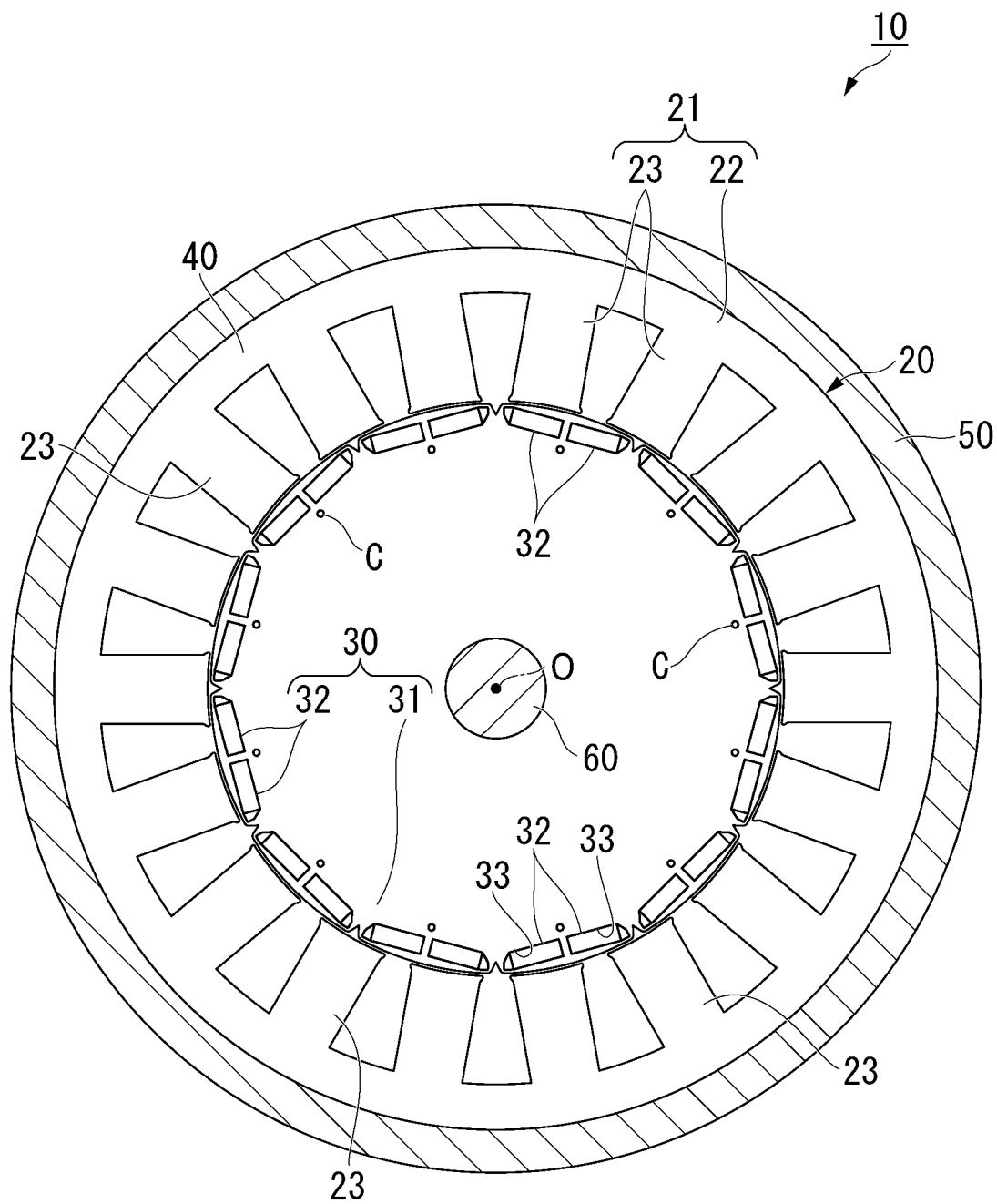
FIG. 1 is a cross-sectional view of an electric motor including a laminated core according to an embodiment of the present invention.

As shown in FIG. 1, an electric motor 10 includes a stator 20, a rotor 30, a casing 50, and a rotary shaft 60. The stator 20 and the rotor 30 are housed in the casing 50. The stator 20 is fixed to the casing 50.

In the present embodiment, as the electric motor 10, an inner rotor type electric motor in which the rotor 30 is located inside the stator 20 is employed. However, as the electric motor 10, an outer rotor type electric motor in which the rotor 30 is located outside the stator 20 may be employed. Further, in the present embodiment, the electric motor 10 is a three-phase AC motor with twelve poles and eighteen slots. However, the number of poles, the number of slots, the number of phases, and the like can be appropriately changed.

For example, when an excitation current having an effective value of 10 A and a frequency of 100 Hz is applied to each phase, the electric motor 10 can rotate at a rotation speed of 1000 rpm.

The stator 20 includes a stator core 21 and a winding (not shown).

The stator core 21 includes an annular core back part 22 and a plurality of tooth parts 23. Hereinafter, a direction of the central axis O of the stator core 21 (or the core back part 22) is referred to as an axial direction, a radial direction of the stator core 21 (or the core back part 22) (a direction orthogonal to the central axis O) is referred to as a radial direction, and a circumferential direction of the stator core 21 (or the core back part 22) (a direction of rotation around the central axis O) is referred to as a circumferential direction.

The core back part 22 is formed in a circular shape in a plan view of the stator 20 in the axial direction.

The plurality of tooth parts 23 protrude inward from the core back part 22 in the radial direction (toward the central axis O of the core back part 22 in the radial direction). The plurality of tooth parts 23 are disposed at equal intervals in the circumferential direction. In the present embodiment, eighteen tooth parts 23 are provided every 20 degrees in terms of a central angle centered on the central axis O. The plurality of tooth parts 23 are formed to have the same shape and the same size.

The winding is wound around the tooth parts 23. The winding may be a concentrated winding or a distributed winding.

The rotor 30 is disposed inside the stator 20 (the stator core 21) in the radial direction. The rotor 30 includes a rotor core 31 and a plurality of permanent magnets 32.

The rotor core 31 is disposed coaxially with the stator 20 to form an annular shape (a circular shape). The rotary shaft 60 is disposed in the rotor core 31. The rotary shaft 60 is fixed to the rotor core 31.

The plurality of permanent magnets 32 are fixed to the rotor core 31. In the present embodiment, a set of two permanent magnets 32 form one magnetic pole. A plurality of sets of the permanent magnets 32 are disposed at equal intervals in the circumferential direction. In the present embodiment, twelve sets (twenty four in total) of the permanent magnets 32 are provided every 30 degrees in terms of a central angle centered on the central axis O.

In the present embodiment, as the permanent magnetic electric motor, an interior permanent magnet motor is employed.

In the rotor core 31, a plurality of through holes 33 that penetrate the rotor core 31 in the axial direction are formed. The plurality of through holes 33 are provided corresponding to the plurality of permanent magnets 32. Each permanent magnet 32 is fixed to the rotor core 31 in a state of being disposed in the corresponding through hole 33. For example, an outer surface of the permanent magnet 32 and an inner surface of the through hole 33 are adhered to each other by an adhesive, and thus the fixing of each permanent magnet 32 to the rotor core 31 can be realized. As the permanent magnetic electric motor, a surface permanent magnet motor may be employed instead of the interior permanent magnet motor.

Figure 2:
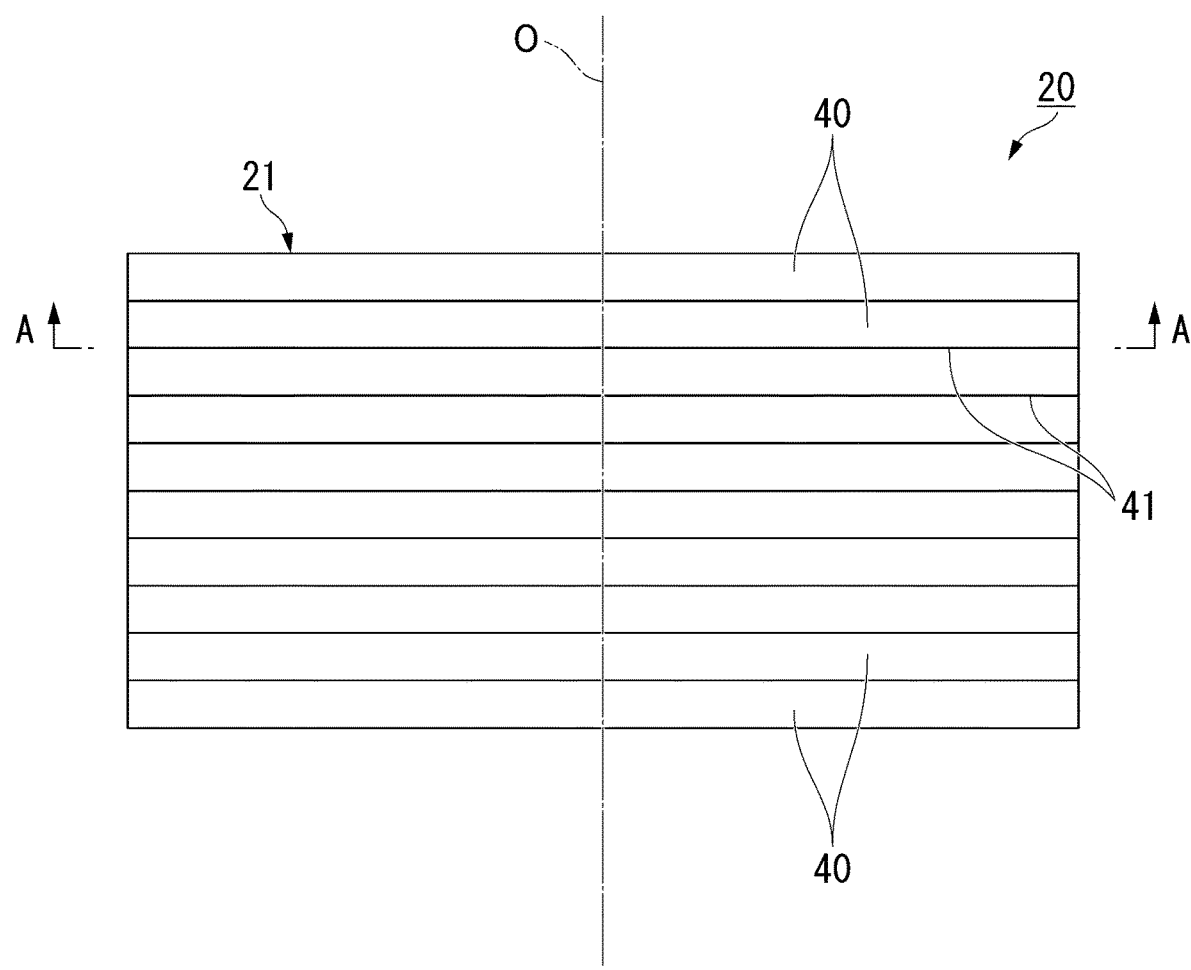
FIG. 2 is a side view of the laminated core shown in FIG. 1.

Each of the stator core 21 and the rotor core 31 is a laminated core. As shown in FIG. 2, the stator 20 is formed by a plurality of electrical steel sheets 40 being stacked.

The stacking thickness of each of the stator core 21 and the rotor core 31 is, for example, 50.0 mm. The outer diameter of the stator core 21 is, for example, 250.0 mm. The inner diameter of the stator core 21 is, for example, 165.0 mm. The outer diameter of the rotor core 31 is, for example, 163.0 mm. The inner diameter of the rotor core 31 is, for example, 30.0 mm. However, these values are examples, and the stacking thickness, the outer diameter, and the inner diameter of the stator core 21 and the stacking thickness, the outer diameter, and the inner diameter of the rotor core 31 are not limited to these values. Here, the inner diameter of the stator core 21 is based on a tip end of each of the tooth parts 23 of the stator core 21. The inner diameter of the stator core 21 is a diameter of a virtual circle inscribed in the tip ends of all of the tooth parts 23.

Each electrical steel sheet 40 for forming the stator core 21 and the rotor core 31 is formed, for example, by a process of punching an electrical steel sheet as a base material. A known electrical steel sheet can be used as the electrical steel sheet 40. The chemical composition of the electrical steel sheet 40 is not particularly limited. In the present embodiment, as the electrical steel sheet 40, a non-grain-oriented electrical steel sheet is employed. As the non-grain-oriented electrical steel sheet, for example, a JIS C 2552: 2014 non-grain-oriented electrical steel strip can be employed.

However, as the electrical steel sheet 40, a grain-oriented electrical steel sheet can also be employed instead of a non-grain-oriented electrical steel sheet. As the grain-oriented electrical steel sheet, for example, a JIS C 2553: 2012 grain-oriented electrical steel strip can be employed.

Both surfaces of the electrical steel sheet 40 are coated with an insulation coating to improve the workability of the electrical steel sheet and to reduce the iron loss of the laminated core. As the substance constituting the insulation coating, for example, (1) an inorganic compound, (2) an organic resin, (3) a mixture of an inorganic compound and an organic resin, and the like can be applied. Examples of the inorganic compound include (1) a complex of dichromate and boric acid, (2) a complex of phosphate and silica, and the like. Examples of the organic resin include an epoxy resin, an acrylic resin, an acrylic-styrene resin, a polyester resin, a silicone resin, a fluorine resin, and the like.

The organic resin may be the same as or different from an organic resin contained in an adhesive which will be described later.

To ensure the insulation performance between the electrical steel sheets 40 stacked with each other, the thickness of the insulation coating (the thickness per one surface of the electrical steel sheet 40) is preferably 0.1 μm or more.

On the other hand, as the insulation coating becomes thicker, the insulation effect becomes saturated. Further, as the insulation coating becomes thicker, the space factor decreases, and a performance for serving as the laminated core deteriorates. Therefore, it is preferable to form the insulation coating as thin as possible in a range that the insulation performance can be ensured. The thickness of the insulation coating (the thickness per one surface of the electrical steel sheet 40) is preferably 0.1 μm or more and 5 μm or less and more preferably 0.1 μm or more and 2 μm or less.

It is possible to measure the thickness of the insulation coating, for example, by observing a cut surface of the electrical steel sheet 40 cut in a thickness direction with a microscope or the like.

As the electrical steel sheet 40 becomes thinner, the effect of reducing the iron loss gradually becomes saturated. Further, as the electrical steel sheet 40 becomes thinner, the manufacturing cost of the electrical steel sheet 40 increases. Therefore, in consideration of the effect of reducing the iron loss and the manufacturing cost, the thickness of the electrical steel sheet 40 is preferably 0.10 mm or more.

On the other hand, if the electrical steel sheet 40 is too thick, a press punching operation of the electrical steel sheet 40 becomes difficult. Therefore, in consideration of the press punching operation of the electrical steel sheet 40, the thickness of the electrical steel sheet 40 is preferably 0.65 mm or less.

Further, as the electrical steel sheet 40 becomes thicker, the iron loss increases. Therefore, in consideration of the iron loss characteristics of the electrical steel sheet 40, the thickness of the electrical steel sheet 40 is preferably 0.35 mm or less, more preferably 0.25 mm or less, and further preferably 0.20 mm or less.

In consideration of the above points, for example, the thickness of each electrical steel sheet 40 is preferably 0.10 mm or more and 0.65 mm or less, more preferably 0.10 mm or more and 0.35 mm or less, further preferably 0.10 mm or more and 0.25 mm or less, and particularly preferably 0.10 mm or more and 0.20 mm or less. The thickness of the electrical steel sheet 40 also includes the thickness of the insulation coating.

The thickness of the electrical steel sheet 40 can be measured with, for example, a micrometer or the like.

Figure 3:
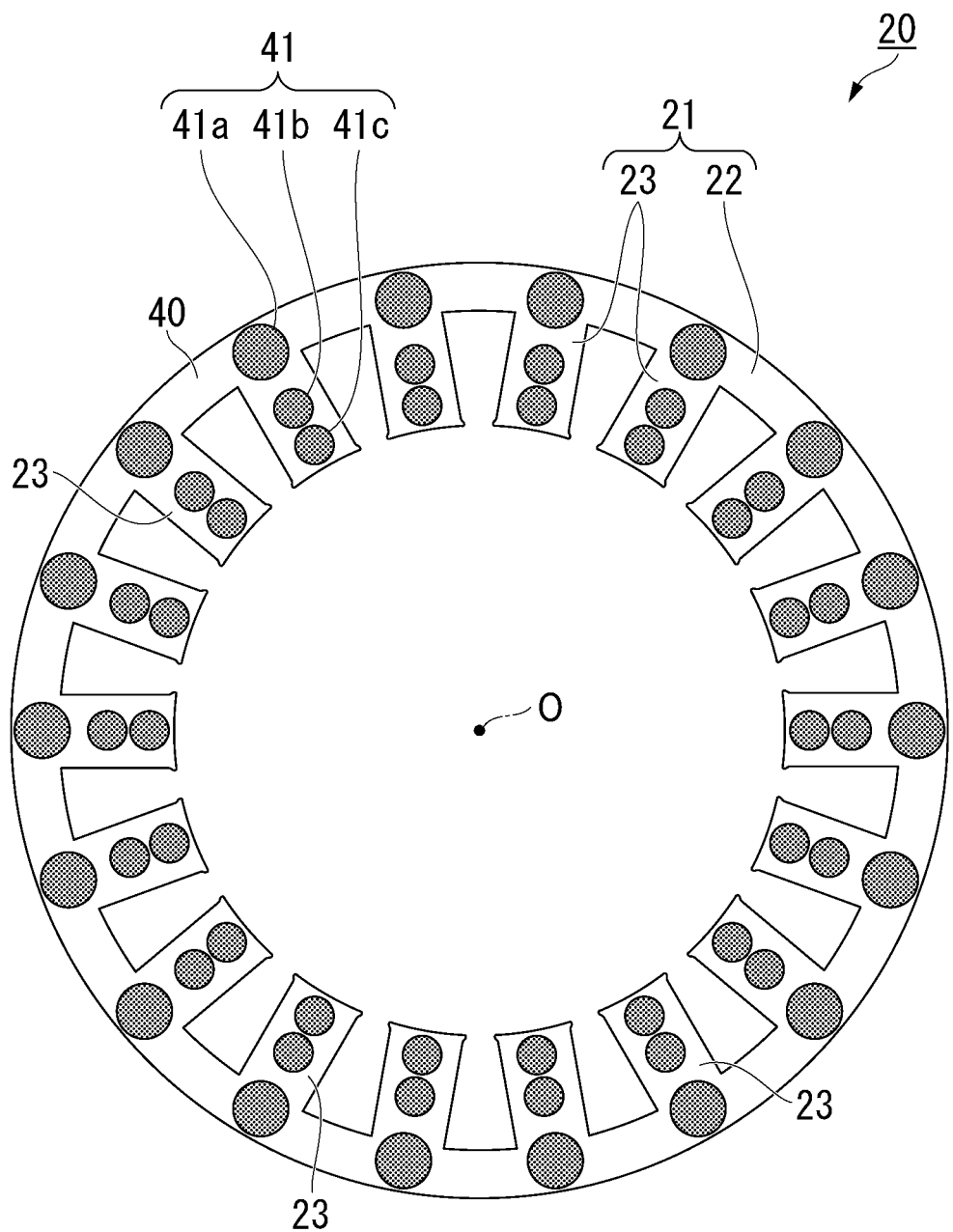
FIG. 3 is a cross-sectional view along line A-A of FIG. 2.

As shown in FIG. 3, the plurality of electrical steel sheets 40 for forming the stator core 21 are stacked via an adhesion part 41. The adhesion part 41 is formed in the core back part 22 of the stator core 21 and the tooth parts 23. The adhesion part 41 is formed as 41a, 41b, and 41c from an inner circumference of the core back part 22 toward an inside in the radial direction (toward the central axis O of the core back part 22 in the radial direction). The adhesion parts 41b and 41c are formed in each of the plurality of tooth parts 23. The adhesion part 41a is formed in the core back part 22 at a position corresponding to each of the plurality of tooth parts 23.

The adhesion part 41 is formed of an adhesive that includes a first phase and a second phase.

The adhesion part 41 has a sea-island structure of the first phase and the second phase. Here, the "sea-island structure" means a phase separation structure in which a phase (an island structure portion) including one component is dispersed in a phase (a sea structure portion) including the other component.

In the electrical steel sheet 40 of the present embodiment, since the adhesion part 41 has a sea-island structure, it is easy to mitigate a strain occurring in the electrical steel sheet 40. By mitigating the strain occurring in the electrical steel sheet 40, it is easy to reduce a hysteresis loss, and as a result, it is possible to improve the magnetic properties of the laminated core. It is considered that the sea-island structure of a cured product of the first phase which is hard and the second phase which is soft easily absorbs the strain occurring in the electrical steel sheet 40, and thus the strain occurring in the electrical steel sheet 40 can be mitigated.

The hysteresis loss refers to an energy loss caused by a change in a direction of a magnetic field of the laminated core. The hysteresis loss is a type of an iron loss.

In the adhesion part 41 of the present embodiment, the first phase forms the sea structure portion which is a continuous phase, and the second phase forms the island structure portion which is a dispersed phase. Between the first phase and the second phase, a phase that forms the sea structure portion is determined with the viscosity and amount of the phase. In the adhesion part 41 of the present embodiment, the first phase which has a lower viscosity and a larger amount than the second phase forms the sea structure portion which is a continuous phase.

The adhesive for forming the adhesion part 41 includes the first phase and the second phase.

The first phase contains an epoxy resin, an acrylic resin, and a curing agent. As the cured product of the first phase, an acrylic modified epoxy resin obtained by graft polymerization of the acrylic resin with the epoxy resin is preferable from the viewpoint of easily increasing the adhesion strength of the adhesion part 41.

The adhesive is promoted to be cured, for example, by being heated to 80° C. or higher at normal pressure to become a cured product. Here, the "normal pressure" refers to a pressure when neither decompression nor pressurization is performed and is usually about 1 atm (0.1 MPa).

The amount of the first phase is preferably 50% by volume or more, more preferably 50% to 95% by volume, further preferably 60% to 90% by volume, and particularly preferably 70% to 80% by volume with respect to the total volume of the adhesive. When the amount of the first phase is the above lower limit value or more, it is easy to increase the adhesion strength of the adhesion part 41. When the amount of the first phase is the above upper limit value or less, it is easy to mitigate the strain occurring in the electrical steel sheet 40.

The amount of the first phase is a ratio of the volume of the first phase to the total volume of the adhesive at 25° C.

The SP value (solubility parameter) of the first phase is 8.5 to 10.7 $(cal/cm^3)^{1/2}$, preferably 8.7 to 10.5 $(cal/cm^3)^{1/2}$, and more preferably 9.0 to 10.0 $(cal/cm^3)^{1/2}$. When the SP value of the first phase is the above lower limit value or more, it is easy for the adhesion part 41 to form the sea-island structure with the second phase. When the SP value of the first phase is the above upper limit value or less, it is easy to apply the adhesive to the surface of the electrical steel sheet 40.

In the present description, the "SP value" means the solubility parameter of Hildebrand.

It is possible to measure the SP value of the first phase, for example, by the following method. A resin composition constituting the first phase is applied to a surface of the non-grain-oriented electrical steel sheet and is heated to 120° C. to be cured.

When various solvents with known SP values are rubbed against the obtained cured product, the cured product of the first phase is dissolved in the solvent, and thus the solvent is discolored, the SP value of the solvent is set to the SP value of the first phase.

Examples of various solvents with known SP values include n-pentane (SP value: 7.0 $(cal/cm^3)^{1/2}$), n-hexane (SP value: 7.3 $(cal/cm^3)^{1/2}$), diethyl ether (SP value: 7.4 $(cal/cm^3)^{1/2}$), n-octane (SP value: 7.6 $(cal/cm^3)^{1/2}$), vinyl chloride (SP value: 7.8 $(cal/cm^3)^{1/2}$), cyclohexane (SP value: 8.2 $(cal/cm^3)^{1/2}$), isobutyl acetate (SP value: 8.3 $(cal/cm^3)^{1/2}$), isopropyl acetate (SP value: 8.4 $(cal/cm^3)^{1/2}$), butyl acetate (SP value: 8.5 $(cal/cm^3)^{1/2}$), carbon tetrachloride (SP Value: 8.6 $(cal/cm^3)^{1/2}$), methyl propyl ketone (SP value: 8.7 $(cal/cm^3)^{1/2}$), xylene (SP value: 8.8 $(cal/cm^3)^{1/2}$), toluene (SP value: 8.9 $(cal/cm^3)^{1/2}$), ethyl acetate (SP value: 9.1 $(cal/cm^3)^{1/2}$), benzene (SP value: 9.2 $(cal/cm^3)^{1/2}$), methyl ethyl ketone (SP value: 9.3 $(cal/cm^3)^{1/2}$), methylene chloride (SP value: 9.7 $(cal/cm^3)^{1/2}$), acetone (SP value: 9.9 $(cal/cm^3)^{1/2}$), carbon disulfide (SP value: 10.0 $(cal/cm^3)^{1/2}$), acetic acid (10.1 $(cal/cm^3)^{1/2}$), n-hexanol (SP value: 10.7 $(cal/cm^3)^{1/2}$), and the like.

The SP value of the first phase can be adjusted with the type and the amount of the epoxy resin constituting the first phase, the type and amount of the acrylic resin, the type and amount of the curing agent, and the like.

The number average molecular weight of the epoxy resin in the first phase is preferably 1200 to 20000, more preferably 2000 to 18000, and further preferably 2500 to 16000. When the number average molecular weight of the epoxy resin is the above lower limit value or more, it is easy to increase the adhesion strength of the adhesion part 41. When the number average molecular weight of the epoxy resin is the above upper limit value or less, it is easy to increase the stability of the adhesion part 41.

The number average molecular weight of the epoxy resin can be measured by size-exclusion chromatography (SEC) described in JIS K 7252-1: 2008 using polystyrene as a standard substance.

Examples of the epoxy resin include a resin obtained by condensing epichlorohydrin and bisphenol in the presence of an alkaline catalyst, a resin obtained by condensing epichlorohydrin and bisphenol into a low molecular weight epoxy resin in the presence of an alkaline catalyst and subjecting the low molecular weight epoxy resin and bisphenol to a heavy addition reaction, and the like. Here, the "low molecular weight epoxy resin" means an epoxy resin having a number average molecular weight of less than 1200.

The epoxy resin may be an epoxy ester resin in which a divalent carboxylic acid is incorporated. Examples of the divalent carboxylic acid include succinic acid, adipic acid, pimelic acid, azelaic acid, sebacic acid, dodecanedioic acid, hexahydrophthalic acid, and the like.

Examples of the bisphenol include bisphenol A, bisphenol F, bisphenol AD, and the like, and bisphenol A and bisphenol F are preferable.

Examples of the alkaline catalyst include sodium hydroxide, potassium hydroxide, and the like.

Among these epoxy resins, one type may be used alone, or two or more types may be used in combination.

The amount of the epoxy resin is preferably 50% by volume or more, more preferably 50% to 94% by volume, further preferably 55% to 90% by volume, and particularly preferably 60% to 80% by volume with respect to the total volume of the first phase. When the amount of the epoxy resin is the above lower limit value or more, it is easy to increase the adhesion strength of the adhesion part 41. When the amount of the epoxy resin is the above upper limit value or less, it is easy to mitigate the strain occurring in the electrical steel sheet 40.

The amount of the epoxy resin is a ratio of the volume of the epoxy resin to the total volume of the first phase before curing at 25° C.

The number average molecular weight of the acrylic resin in the first phase is preferably 5000 to 100000, more preferably 6000 to 80000, and further preferably 7000 to 60000. When the number average molecular weight of the acrylic resin is the above lower limit value or more, it is easy to increase the adhesion strength of the adhesion part 41. When the number average molecular weight of the acrylic resin is the above upper limit value or less, it is easy to prevent the adhesive from becoming highly viscous, and it is easy to apply the adhesive to the surface of the electrical steel sheet 40.

The number average molecular weight of the acrylic resin can be measured by the same method as in the number average molecular weight of the epoxy resin.

Examples of the acrylic resin include an acrylic resin obtained by polymerizing or copolymerizing at least one selected from unsaturated carboxylic acids such as acrylic acid, methacrylic acid, maleic acid, itaconic acid, and crotonic acid, an acrylic resin obtained by copolymerizing at least one monomer selected from the above unsaturated carboxylic acids and at least one selected from the following radically polymerizable unsaturated monomers, and the like.

Examples of a radically polymerizable unsaturated monomer include (1) a hydroxyalkyl ester, in which the number of carbon atoms of the acrylate or methacrylate is 1 to 8, such as 2-hydroxyethyl acrylate, 2-hydroxyethyl methacrylate, hydroxypropyl acrylate, and hydroxypropyl methacrylate, (2) an alkyl ester or cycloalkyl ester, in which the number of carbon atoms of the acrylate or methacrylate is 1 to 24, such as methyl acrylate, methyl methacrylate, ethyl acrylate, ethyl methacrylate, n-butyl acrylate, n-butyl methacrylate, isobutyl acrylate, isobutyl methacrylate, tert-butyl acrylate, tert-butyl methacrylate, cyclohexyl acrylate, cyclohexyl methacrylate, 2-ethylhexyl acrylate, 2-ethylhexyl methacrylate, lauryl acrylate, lauryl methacrylate, stearyl acrylate, stearyl methacrylate, and decyl acrylate, (3) a functional acrylamide or functional methacrylicamide such as acrylamide, methacrylamide, N-methylacrylamide, N-ethylacrylamide, diacetone acrylamide, N-methylolacrylamide, N-methylolmethacrylicamide, N-methoxymethylacrylamide, and N-butoxymethylacrylamide, (4) an aromatic vinyl monomer such as styrene, vinyltoluene, and α-methylstyrene, (5) an aliphatic vinyl monomer such as vinyl acetate, vinyl propionate, acrylonitrile, and methacrylic acid, and the like.

Examples of a preferable combination of the above unsaturated monomers include a combination of methyl methacrylate, 2-ethylhexyl acrylate, and acrylic acid, a combination of styrene, methyl methacrylate, ethyl acrylate, and methacrylic acid, a combination of styrene, ethyl acrylate, and methacrylic acid, a combination of methyl methacrylate, ethyl acrylate, and acrylic acid, and the like.

The acrylic modified epoxy resin (hereinafter also referred to as a "grafted product") obtained by the graft polymerization of the acrylic resin with an epoxy resin is obtained, for example, by the graft polymerization reaction of the above-mentioned radically polymerizable unsaturated monomer with a high molecular weight epoxy resin in the presence of a radical generator such as benzoyl peroxide in an organic solvent solution. Here, the "high molecular weight epoxy resin" means an epoxy resin having a number average molecular weight of 1200 or more.

The radical generator used in the graft polymerization reaction is preferably 3 to 15 parts by mass with respect to 100 parts by mass of a solid component of the radically polymerizable unsaturated monomer.

The above-mentioned graft polymerization reaction can be performed, for example, by adding the radically polymerizable unsaturated monomer, in which the radical generator uniformly mixed, to the organic solvent solution of the high molecular weight epoxy resin heated to 80° C. to 150° C. for 1 to 3 hours and keeping the same temperature for 1 to 3 hours.

The organic solvent used in the graft polymerization reaction may be any organic solvent that dissolves the high molecular weight epoxy resin and the radically polymerizable unsaturated monomer and can be mixed with water. Examples of such an organic solvent include an alcohol solvent such as isopropanol, butyl alcohol, 2-hydroxy-4-methylpentane, 2-ethylhexyl alcohol, cyclohexanol, ethylene glycol, diethylene glycol, 1,3-butylene glycol, ethylene glycol monoethyl ether, ethylene glycol monobutyl ether, and diethylene glycol monomethyl ether, a ketone solvent such as acetone and methyl ethyl ketone, a cellosolve solvent, and a carbitol-based solvent. In addition, an inert organic solvent that does not mix with water also can be used, and examples of such an organic solvent include aromatic hydrocarbons such as toluene and xylene and esters such as ethyl acetate and butyl acetate.

The amount of the acrylic resin is preferably 5% to 45% by volume, more preferably 10% to 40% by volume, and further preferably 15% to 30% by volume with respect to the total volume of the first phase. When the amount of the acrylic resin is the above lower limit value or more, it is easy to increase the adhesion strength of the adhesion part 41. When the amount of the acrylic resin is the above upper limit value or less, it is easy to stabilize the SP value of the first phase.

The amount of the acrylic resin is a ratio of the volume of the acrylic resin to the total volume of the first phase before curing at 25° C.

As the curing agent in the first phase, a commonly used epoxy resin curing agent can be used. As the curing agent in the first phase, for example, at least one selected from a polyamine-based curing agent such as an aliphatic polyamine, an alicyclic polyamine, an aromatic polyamine, a polyamide polyamine, and a modified polyamine; an acid anhydride-based curing agent such as a monofunctional acid anhydride (a phthalic anhydride, a hexahydrophthalic anhydride, a methyltetrahydrophthalic anhydride, a methylhexahydrophthalic anhydride, a methylnadic anhydride, a chlorendic anhydride, and the like), a bifunctional acid anhydride (a pyromellitic anhydride, a benzophenonetetracarboxylic acid anhydride, an ethylene glycol bis(anhydrotrimellitate), a methylcyclohexenetetracarboxylic acid anhydride, and the like), and a free acid anhydride (trimellitic anhydride, polyazeleic acid anhydride, and the like); a methylol group-containing initial condensate such as a novolac type or resol type phenolic resin, a urea resin, and a melamine resin; a latent curing agent; and the like can be used.

Examples of the latent curing agent include dicyandiamide, melamine, organic acid dihydrazides, amineimides, ketimines, tertiary grade amines, imidazole salts, boron trifluoride amine salts, a microcapsule type curing agent (the curing agent is encapsulated in a microcapsule formed of casein or the like, the microcapsule is degraded by heating and pressurizing, and the curing agent is subjected to a curing reaction with the resin), a molecular sieve type curing agent (the curing agent is adsorbed on a surface of an adsorptive compound, the adsorbed molecules are released by heating, and the curing agent is subjected to a curing reaction with the resin), and the like.

As the curing agent, a novolac type phenolic resin (a phenolic novolac resin) is preferable from the viewpoint of easily increasing the adhesion strength of the adhesion part 41. Here, the "novolac type phenolic resin" means a resin obtained by subjecting phenols and aldehydes to a condensation reaction using an acid catalyst.

Examples of the phenols include phenol.

Examples of the aldehydes include formaldehyde.

Examples of the acid catalyst include oxalic acid and divalent metal salt.

The novolac type phenolic resin is solid at room temperature (25° C.) and is classified as a thermoplastic resin. In the novolac type phenolic resin, hardly any —$CH_2OH$ groups are bonded to a phenol nucleus (an aromatic ring) constituting the phenolic resin.

The amount of the curing agent is preferably 1% to 40% by volume, more preferably 5% to 30% by volume, and further preferably 10% to 20% by volume with respect to the total volume of the first phase. When the amount of the curing agent is the above lower limit value or more, it is easy to increase the adhesion strength of the adhesion part 41. When the amount of the curing agent is the above upper limit value or less, it is easy to increase the stability of the adhesion part 41.

The amount of the curing agent is a ratio of the volume of the curing agent to the total volume of the first phase before curing at 25° C.

The second phase contains an elastomer. Examples of the elastomer include natural rubbers and synthetic rubbers, and a synthetic rubber is preferable.

Examples of the synthetic rubbers include polybutadiene synthetic rubber, nitrile synthetic rubber, chloroprene synthetic rubber, and the like.

Examples of the polybutadiene synthetic rubber include isoprene rubber (IR, SP value: 7.9 to 8.4 $(cal/cm^3)^{1/2}$), butadiene rubber (BR, SP value: 8.1 to 8.6 $(cal/cm^3)^{1/2}$), styrene-butadiene rubber (SBR, SP value: 8.1 to 8.7 $(cal/cm^3)^{1/2}$), polyisobutylene (butyl rubber, IiR, SP value: 7.7 to 8.1 $(cal/cm^3)^{1/2}$), ethylene propylene diene rubber (EPDM, SP value: 7.9 to 8.0 $(cal/cm^3)^{1/2}$), and the like.

Examples of the nitrile synthetic rubber include acrylonitrile butadiene rubber (NBR, SP value: 8.7 to 10.5 $(cal/cm^3)^{1/2}$), acrylic rubber (ACM, SP value: 9.4 $(cal/cm^3)^{1/2}$), and the like.

Examples of the chloroprene synthetic rubber include chloroprene rubber (CR, SP value: 8.2 to 9.4 $(cal/cm^3)^{1/2}$).

As the synthetic rubber, in addition to the above, urethane rubber (SP value: 10.0 $(cal/cm^3)^{1/2}$), silicone rubber (SP value: 7.3 to 7.6 $(cal/cm^3)^{1/2}$), fluoro rubber (FKM, SP value: 8.6 $(cal/cm^3)^{1/2}$), chlorosulfonated polyethylene (CSM, SP value: 8.1 to 10.6 $(cal/cm^3)^{1/2}$), epichlorohydrin rubber (ECO, SP value: 9.6 to 9.8 $(cal/cm^3)^{1/2}$), and the like may be used.

As the elastomer, SBR, EPDM, and NBR are preferable from the viewpoints of excellent heat resistance and easy mitigation of the strain occurring in the electrical steel sheet 40.

Among these elastomers, one type may be used alone, or two or more types may be used in combination.

The second phase may contain a compound other than the elastomer. Examples of the compound other than the elastomer include the above-mentioned acrylic resin and the like.

The amount of the elastomer is preferably 50% by volume or more, more preferably 70% by volume or more, further preferably 90% by volume or more, and particularly preferably 100% by volume with respect to the total volume of the second phase. When the amount of the elastomer is the above lower limit value or more, it is easy for the adhesion part 41 to form the sea-island structure with the first phase and the second phase, and it is easy to mitigate the strain occurring in the electrical steel sheet 40.

The amount of the elastomer is a ratio of the volume of the elastomer to the total volume of the second phase at 25° C.

The amount of the second phase is preferably 5% to 50% by volume, more preferably 10% to 40% by volume, and further preferably 20% to 30% by volume with respect to the total volume of the adhesive. When the amount of the second phase is the above lower limit value or more, it is easy to mitigate the strain occurring in the electrical steel sheet 40. When the amount of the second phase is the above upper limit value or less, it is easy to increase the adhesion strength of the adhesion part 41.

The amount of the second phase is a ratio of the volume of the second phase to the total volume of the adhesive at 25° C. When the second phase is immersed in water at 25° C., the volume of the water is increased, and the volume of the second phase is obtained with the increased volume of the water.

The SP value of the second phase is 7.5 to 8.4 $(cal/cm^3)^{1/2}$, preferably 7.7 to 8.2 $(cal/cm^3)^{1/2}$, and more preferably 7.9 to 8.0 $(cal/cm^3)^{1/2}$. When the SP value of the second phase is the above lower limit value or more, it is easy to apply the adhesive to the surface of the electrical steel sheet 40. When the SP value of the second phase is the above upper limit value or less, it is easy for the adhesion part 41 to form the sea-island structure with the first phase and the second phase.

It is possible to measure the SP value of the second phase, for example, by the following method. A resin composition constituting the second phase is applied to a surface of the non-grain-oriented electrical steel sheet and is heated to 120° C. to be cured. When various solvents with known SP values are rubbed against the obtained cured product, the cured product of the second phase is dissolved in the solvent, and thus the solvent is discolored, the SP value of the solvent is set to the SP value of the second phase.

Examples of various solvents each having a known SP value include solvents similar to various solvents in which the SP value obtained when the SP value of the first phase is measured is known.

The SP value of the second phase can be adjusted with the type and the amount of the elastomer in the resin composition constituting the second phase, the type and the amount of the compound other than the elastomer contained in the second phase, and a combination thereof.

A difference between the SP value of the first phase and the SP value of the second phase is preferably 0.1 to 3.0 $(cal/cm^3)^{1/2}$, more preferably 1.0 to 3.0 $(cal/cm^3)^{1/2}$, and further preferably 1.5 to 2.5 $(cal/cm^3)^{1/2}$. When the difference between the SP value of the first phase and the SP value of the second phase is the above lower limit value or more, it is easy for the adhesion part to form the sea-island structure with the first phase and the second phase. When the difference between the SP value of the first phase and the SP value of the second phase is the above upper limit value or less, the second phase is uniformly dispersed, and it is easy to increase the stability of the adhesive. In addition, when the difference between the SP value of the first phase and the SP value of the second phase is within the above numerical range, it is easy to mitigate the strain occurring in the electrical steel sheet 40 to reduce the iron loss of the laminated core, and it is easier to improve the magnetic properties of the laminated core.

The difference between the SP value of the first phase and the SP value of the second phase is obtained by measuring the SP value of the first phase and the SP value of the second phase and subtracting the obtained SP value of the second phase from the obtained SP value of the first phase.

The adhesive of the present embodiment may contain an optional component in addition to the above-mentioned first phase and second phase. Examples of the optional component include a synthetic resin such as a polyolefin resin, a polyurethane resin, a polyamide resin, a polyimide resin, a polyester resin, a silicone resin, and a fluororesin; oxide fine particles such as silica and alumina; a conductive substance; an anti-rust additive such as sparingly soluble chromate; a coloring pigment (for example, a condensed polycyclic organic pigment, a phthalocyanine organic pigment, and the like); a coloring dye (for example, an azo dye, an azo metal complex salt dye, and the like); a film forming aid; a dispersibility improver; an anti-foaming agent; and the like.

Among these optional components, one type may be used alone, or two or more types may be used in combination.

In a case in which the adhesive contains the optional component, the amount of the optional component is preferably 1% to 40% by volume with respect to the total volume of the adhesive at 25° C.

As the adhesive of the present embodiment, in addition to the thermosetting type adhesive, a radical polymerization type adhesive and the like can also be used, and from the viewpoint of productivity, it is desirable to use a room temperature curing type adhesive. The room temperature curing type adhesive cures at 20° C. to 30° C. As the room temperature curing type adhesive, an acrylic-based adhesive is preferable. Typical acrylic-based adhesives include a second generation acrylic-based adhesive (SGA) and the like. Any one of an anaerobic adhesive, an instant adhesive, and an elastomer-containing acrylic-based adhesive can be used as long as the effects of the present invention are not impaired. The adhesive referred to here refers to an adhesive in a state before curing, and after the adhesive cures, it becomes the adhesion part 41.

An average tensile modulus of elasticity E of the adhesion parts 41 at room temperature (20° C. to 30° C.) is in the range of 1500 MPa to 4500 MPa. If the average tensile modulus of elasticity E of the adhesion parts 41 is less than 1500 MPa, a problem that the rigidity of the laminated core is lowered occurs. Therefore, a lower limit value of the average tensile modulus of elasticity E of the adhesion parts 41 is 1500 MPa, and more preferably 1800 MPa. On the contrary, if the average tensile modulus of elasticity E of the adhesion parts 41 exceeds 4500 MPa, a problem that the insulation coating formed on the surface of the electrical steel sheet 40 is peeled off occurs. Therefore, an upper limit of the average tensile modulus of elasticity E of the adhesion parts 41 is 4500 MPa, and more preferably 3650 MPa.

The average tensile modulus of elasticity E is measured by a resonance method. Specifically, a tensile modulus of elasticity is measured in conformity with JIS R 1602: 1995.

More specifically, first, a sample for measurement (not shown) is made. This sample is obtained by adhering two electrical steel sheets 40 to each other by the adhesive to be measured and curing the adhesive to form the adhesion part 41. In a case in which the adhesive is a thermosetting type adhesive, this curing is performed by heating and pressurizing under heating and pressurizing conditions in actual operation. On the other hand, in a case in which the adhesive is a room temperature curing type adhesive, the curing is performed by pressurizing at room temperature.

Then, the tensile modulus of elasticity of this sample is measured by a resonance method. As described above, a method of measuring a tensile modulus of elasticity by the resonance method is performed in conformity with JIS R 1602: 1995. After that, the tensile modulus of elasticity of the adhesion part 41 alone is obtained by removing the influence of the electrical steel sheet 40 itself from the tensile modulus of elasticity (the measured value) of the sample by calculation.

The tensile modulus of elasticity thus obtained from the sample is equal to an average value for the laminated core as a whole, and thus this value is regarded as the average tensile modulus of elasticity E. The composition of the average tensile modulus of elasticity E is set such that the average tensile modulus of elasticity E is hardly changed depending on a stacking position in the stacking direction and a circumferential position around the central axis of the laminated core. Therefore, a value obtained by measuring the tensile modulus of elasticity of the cured adhesion part 41 at an upper end position in the laminated core can be regarded as the average tensile modulus of elasticity E.

As an adhesion method, a method of applying an adhesive to the electrical steel sheets 40, and then adhering the electrical steel sheets 40 to each other by either one or both of heating and press-stacking can be employed. A heating means may be, for example, any means such as a method of heating in a high temperature bath or an electric furnace, a method of directly energizing, or the like.

To obtain stable and sufficient adhesion strength, the thickness of each of the adhesion parts 41 is preferably 1 µm or more.

On the other hand, when the thickness of each of the adhesion parts 41 exceeds 100 µm, an adhesion force becomes saturated. Further, as each of the adhesion parts 41 becomes thicker, the space factor decreases, and the magnetic properties of the laminated core in the iron loss and the like deteriorates. Therefore, the thickness of the adhesion part 41 is preferably 1 µm or more and 100 µm or less, and more preferably 1 µm or more and 10 µm or less.

In the above, the thickness of each of the adhesion parts 41 means an average thickness of the adhesion parts 41.

The average thickness of the adhesion parts 41 is more preferably 1.0 µm or more and 3.0 µm or less. If the average thickness of the adhesion parts 41 is less than 1.0 µm, a sufficient adhesion force cannot be secured as described above. Therefore, a lower limit of the average thickness of the adhesion parts 41 is 1.0 µm, and more preferably 1.2 µm. On the contrary, if the average thickness of the adhesion parts 41 becomes thicker than 3.0 µm, problems such as a large increase in a strain amount of the electrical steel sheet 40 due to shrinkage during thermosetting occur. Therefore, an upper limit of the average thickness of the adhesion parts 41 is 3.0 µm, and more preferably 2.6 µm.

The average thickness of the adhesion parts 41 is an average value for the laminated core as a whole. The average thickness of the adhesion parts 41 is hardly changed depending on a stacking position in the stacking direction and a circumferential position around the central axis of the laminated core. Therefore, an average value of values obtained by measuring the thicknesses of the adhesion parts 41 at the upper end position in the laminated core at ten or more points in the circumferential direction can be regarded as the average thickness of the adhesion parts 41.

The average thickness of the adhesion parts 41 can be adjusted, for example, by changing the application amount of the adhesive. Further, for example, in a case of a thermosetting type adhesive, the average tensile modulus of elasticity E of the adhesion parts 41 can be adjusted by changing either one or both of heating and pressurizing conditions applied at the time of adhesion and the type of a curing agent.

In the present embodiment, the plurality of electrical steel sheets 40 for forming the rotor core 31 are fixed to each other by a fastening part C (a dowel). However, the plurality of electrical steel sheets 40 for forming the rotor core 31 may be adhered to each other by the adhesion part 41.

The laminated core such as the stator core 21 and the rotor core 31 may be formed by so-called the rotationally stacking.

A method of manufacturing the laminated core according to the embodiment of the present invention has a step (an applying step) of applying the adhesive that includes the first phase containing the epoxy resin, the acrylic resin, and the curing agent and the second phase containing the elastomer to the surface of the electrical steel sheet, a step (a stacking step) of stacking the plurality of electrical steel sheets to which the adhesive has been applied, and a step (a curing step) of curing the adhesive to form the adhesion part. Next, the method of manufacturing the stator core 21 of the present embodiment will be described with reference to the drawings.

Figure 4:
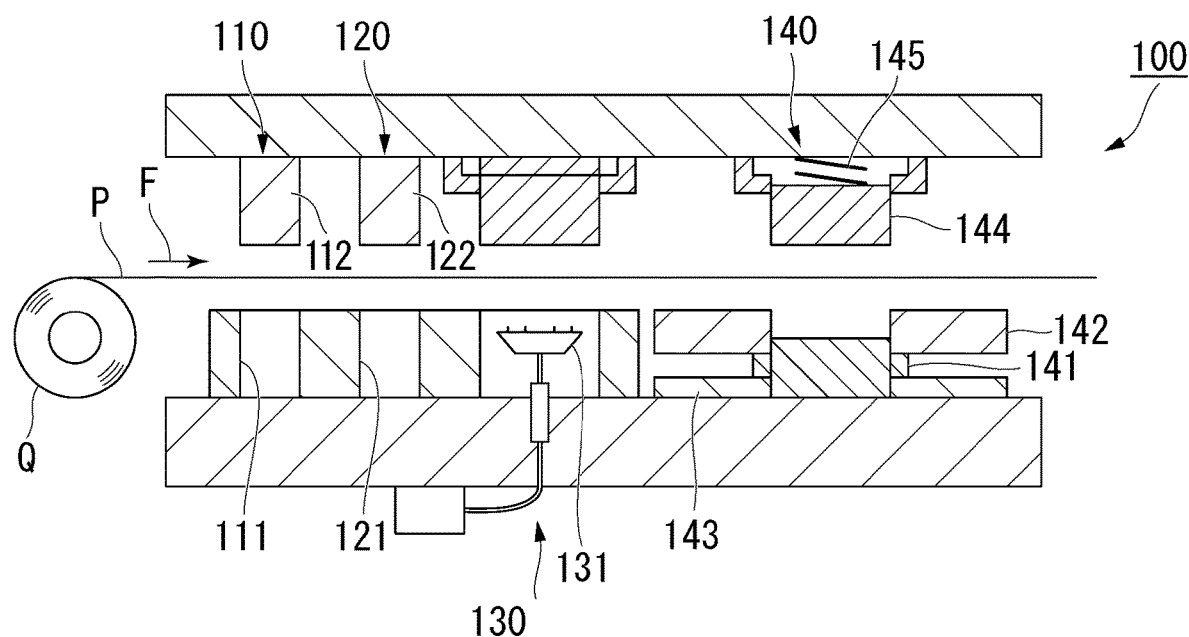
FIG. 4 is a side view showing a schematic configuration of a manufacturing apparatus of the laminated core.

As shown in FIG. 4, in a manufacturing apparatus 100, while an original steel sheet P is fed from a coil Q (a hoop) in a direction of an arrow F, the original steel sheet P is punched a plurality of times by a mold disposed in each stage and is gradually formed into a shape of the electrical steel sheet 40. The adhesive is applied to a lower surface of the electrical steel sheet 40 (the applying step), the punched electrical steel sheets 40 are stacked (the stacking step), the adhesive is cured by being heated and adhered while being pressurized, the electrical steel sheets 40 are adhered to each other with the adhesion part 41, and the stator core 21 is formed (the curing step).

The manufacturing apparatus 100 includes a first-stage punching station 110 located closest to the coil Q, a second-stage punching station 120 disposed adjacent to the punching station 110 on a downstream side of the punching station 110 in a transport direction of the original steel sheet P, and an adhesive-coating station 130 disposed adjacent to the punching station 120 on the downstream side of the punching station 120.

The punching station 110 includes a fixed mold 111 disposed below the original steel sheet P and a moving mold 112 disposed above the original steel sheet P.

The punching station 120 includes a fixed mold 121 disposed below the original steel sheet P and a moving mold 122 disposed above the original steel sheet P.

The adhesive-coating station 130 includes an applicator 131 including a plurality of injectors disposed according to an application pattern of the adhesive.

The manufacturing apparatus 100 further includes a stacking station 140 at a position downstream of the adhesive-coating station 130. The stacking station 140 includes a heating device 141, a fixed mold for an outer shape 142, a heat insulation member 143, a moving mold for an outer shape 144, and a spring 145.

The heating device 141, the fixed mold for an outer shape 142, and the heat insulation member 143 are disposed below the original steel sheet P. On the other hand, the moving mold for an outer shape 144 and the spring 145 are disposed above the original steel sheet P.

In the manufacturing apparatus 100, first, the original steel sheet P is sequentially fed from the coil Q in the direction of the arrow F in FIG. 4. Then, with respect to the original steel sheet P, a punching process is performed by the punching station 110 first. Subsequently, with respect to the original steel sheet P, a punching process is performed by the punching station 120. By these punching processes, the shape of the electrical steel sheet 40 having the core back part 22 and the plurality of tooth parts 23 shown in FIG. 3 is obtained on the original steel sheet P (a punching step). However, since it is not completely punched at this point, the process proceeds to the next step in the direction of the arrow F. At the adhesive-coating station 130 in the next step, the adhesive supplied from each of the injectors of the applicator 131 is applied in dots (the applying step).

Next, the original steel sheet P is fed to the stacking station 140, is punched by the moving mold for an outer shape 144, and is stacked with high accuracy (the stacking step). At the time of this stacking, the electrical steel sheet 40 receives a constant pressing force by the spring 145. By sequentially repeating the punching step, the applying step, and the stacking step described above, it is possible to stack a predetermined number of electrical steel sheets 40. Further, a laminated body formed by stacking the electrical steel sheets 40 in this way is heated by the heating device 141 to, for example, 60° C. to 200° C. By this heating, the adhesive is cured and the adhesion part 41 is formed (the curing step).

The stator core 21 is completed by the above steps.

As described above, in the electric motor and the laminated core according to the present embodiment, the plurality of electrical steel sheets of each of which both surfaces are coated with the insulation coating are laminated, and the electrical steel sheets adjacent in the stacking direction are adhered to each other with the adhesion part which is formed of the adhesive including the first phase and the second phase. By adhering the electrical steel sheets to each other with the adhesion part, it is possible to obtain sufficient adhesion strength.

In addition, each adhesion part has a sea-island structure of the first phase and the second phase. Therefore, in the electric motor and the laminated core according to the present embodiment, it is easy to mitigate the strain occurring in the electrical steel sheet. As a result, it is easy to reduce a hysteresis loss, and it is possible to improve the magnetic properties of the laminated core.

The laminated core according to the present embodiment has improved magnetic properties. Therefore, the laminated core according to the present embodiment is suitable as a laminated core for a stator (a stator core). The laminated core may be used as a rotor core.

The technical scope of the present invention is not limited to the above-described embodiment, and various modifications can be made without departing from the gist of the present invention.

The shape of the stator core is not limited to the shape shown in the above-described embodiment. Specifically, the dimensions of the outer diameter and the inner diameter of the stator core, the stacking thickness, the number of the slots, the dimensional ratio of each of the tooth parts 23 in the circumferential direction and the radial direction, the dimensional ratio between each of the tooth parts 23 and the core back part 22 in the radial direction, and the like can be arbitrarily designed according to the properties of the desired electric motor.

In the rotor of the above-described embodiment, a set of two permanent magnets 32 form one magnetic pole, but the present invention is not limited to this. For example, one permanent magnet 32 may form one magnetic pole, or three or more permanent magnets 32 may form one magnetic pole.

In the above-described embodiment, the permanent magnetic electric motor has been described as an example of the electric motor, but the structure of the electric motor is not limited to this as will be illustrated below, and as the structure of the electric motor, various known structures that will not be illustrated below can also be adopted.

In the above-described embodiment, the permanent magnetic electric motor has been described as an example of the synchronous motor, however, the present invention is not limited to this. For example, the electric motor may be a reluctance motor or an electromagnet field motor (a wound-field motor).

In the above-described embodiment, the synchronous motor has been described as an example of the AC motor, however, the present invention is not limited to this. For example, the electric motor may be an induction motor.

In the above-described embodiment, the AC motor has been described as an example of the motor, however, the present invention is not limited to this. For example, the electric motor may be a DC motor.

In the above-described embodiment, the motor has been described as an example of the electric motor, however, the present invention is not limited to this. For example, the electric motor may be an electric generator.

In the above-described embodiment, the case in which the laminated core according to the present invention is applied to the stator core has been illustrated, however, the laminated core according to the present invention can also be applied to the rotor core.

In addition, it is possible to appropriately replace the configuration elements in the above-described embodiment with well-known configuration elements without departing from the gist of the present invention, and the above-described modification examples may be appropriately combined.

EXAMPLES

Examples 1 to 7, Comparative Examples 1 to 8

A hoop with a thickness of 0.25 mm was prepared, an insulation coating treatment agent containing metal phosphate and an acrylic resin emulsion was applied to both surfaces of the hoop, and baking was performed at 300° C. to form an insulation coating with 0.8 µm on one surface.

The hoop on which the insulation coating was formed was wound up to form a coil Q. The coil Q was set in the manufacturing apparatus 100 described above, and the original steel sheet P was fed from the coil Q in the direction of the arrow F. Using the manufacturing apparatus 100, a single-plate core (an electrical steel sheet 40) having a ring shape with an outer diameter of 300 mm and an inner diameter of 240 mm and provided with eighteen rectangular tooth parts having a length of 30 mm and a width of 15 mm on the inner diameter side was formed by punching (a punching step).

Subsequently, while the punched single-plate cores are sequentially fed, 5 mg per one point of an adhesive having the composition shown in Table 1 was applied in dots at each position shown in FIG. 3 (an applying step), and the single-plate cores were stacked (a stacking step). By the same operation being repeated, a laminated body in which 130 single-plate cores were stacked was obtained. The obtained laminated body was heated at 120° C. while being pressurized at a pressure of 10 MPa to cure the adhesive (a curing step), and a laminated core (a stator core) of each example was manufactured. The average thickness of adhesion parts was 1.5 µm.

In Table 1, the types of the components of the first phase are as follows.
<Epoxy Resin>
  A1: bisphenol F type
  A2: bisphenol A type
  A3: bisphenol AD type
<Acrylic Resin>
  B1: acrylic acid
  B2: methacrylic acid
  B3: maleic acid
<Curing Agent>
  C1: Diethylaminopropylamine (DEAPA)
  C2: Novolac type phenolic resin
  C3: Methylhexahydrophthalic anhydride In Table 1, the types of the second phase are as follows.
<Elastomer>
  D1: EPDM (SP value: 7.9 to 8.0 $(cal/cm^3)^{1/2}$)
  D2: SBR (SP value: 8.1 to 8.7 $(cal/cm^3)^{1/2}$)
  D3: NBR (SP value: 8.7 to 10.5 $(cal/cm^3)^{1/2}$)

In Table 1, the ratio of each component of the first phase represents the amount (% by volume (vol %)) of each component with respect to the total volume of the first phase.

In Table 1, the ratio of the second phase represents the amount (% by volume (vol %)) of each component with respect to the total volume of the adhesive. The second phase was 100% by volume of an elastomer.

In Table 1, the unit of SP value is $(cal/cm^3)^{1/2}$. The SP value of the first phase was measured by the following method. A resin composition constituting the first phase was applied to a surface of the electrical steel sheet and was heated to 120° C. to be cured. When various solvents with known SP values shown in Table 2 are rubbed against the obtained cured product, the cured product of the first phase is dissolved in the solvent, and thus the solvent is discolored, the SP value of the solvent was set to the SP value of the first phase.

The SP value of the second phase was measured by the following method. The elastomer before being mixed with the resin composition constituting the first phase was heated to 120° C. and cured. When various solvents with known SP values shown in Table 2 are rubbed against the obtained cured product, the cured product of the second phase is dissolved in the solvent, and thus the solvent is discolored, the SP value of the solvent was set to the SP value of the second phase.

In the measurement of the SP value of the first phase and the SP value of the second phase, the solvents shown in Table 2 and a mixed solvent obtained by appropriately mixing two or more of these solvents for adjusting the SP value were prepared such that the SP value could be measured in 0.1 increments in the range of 7.0 to 11.4.

In Table 1, regarding "presence or absence of sea-island structure", when a cut surface obtained by cutting the laminated core in the radial direction to include the adhesion part was observed with a microscope or the like, a case in which a phase separation structure is recognized was set as "presence", and a case in which the phase separation structure is not recognized was set as "absence".

Next, a verification test was executed to verify the above-mentioned effects. The present verification test was executed by a simulation using software. As the software, electromagnetic field simulation software JMAG which is based on a finite element method and is manufactured by JSOL Corporation was used.

The iron loss of the laminated core of each example was obtained by the above simulation.

In addition, as a comparison target, the iron loss of the laminated core in which a plurality of electrical steel sheets were fastened to each other in all layers was also obtained. A value (an iron loss ratio) was obtained by dividing the iron loss of the laminated core of each example by the iron loss of the laminated core as the comparison target. When the iron loss of the laminated core of each example is equivalent to the iron loss of the laminated core as the comparison target, the iron loss ratio becomes 100%. The smaller the iron loss ratio, the smaller the iron loss of the laminated core of each example, and the better the magnetic properties of the laminated core.

The iron loss ratio of the laminated core of each example was calculated, and the magnetic properties of the laminated core of each example were evaluated based on the following evaluation criterion. The results are shown in Table 1.

<<Evaluation criterion>>

A: the iron loss ratio is less than 100%
B: the iron loss ratio is 100% or more

TABLE 1

| | Acrylic modified epoxy resin (first phase) | | | | | | | Elastomer (second phase) | | | Presence or absence of sea-island structure | Magnetic properties |
| | Epoxy resin | | Acrylic resin | | Curing agent | | | | | | | |
| No. | Type | Ratio [vol %] | Type | Ratio [vol %] | Type | Ratio [vol %] | SP value | Type | Ratio [vol %] | SP value | | |
|---|---|---|---|---|---|---|---|---|---|---|---|---|
| Example 1 | A1 | 55 | B1 | 5 | C1 | 40 | 10.7 | D1 | 20 | 7.9 | Presence | A |
| Example 2 | A1 | 50 | B2 | 10 | C2 | 40 | 10.0 | D1 | 25 | 8.0 | Presence | A |
| Example 3 | A1 | 65 | B1 | 25 | C2 | 10 | 9.0 | D3 | 30 | 8.4 | Presence | A |
| Example 4 | A2 | 65 | B1 | 30 | C2 | 5 | 8.6 | D2 | 40 | 8.1 | Presence | A |
| Example 5 | A3 | 59 | B1 | 40 | C3 | 1 | 8.5 | D3 | 50 | 7.9 | Presence | A |
| Example 6 | A1 | 63 | B3 | 22 | C2 | 15 | 9.8 | D2 | 25 | 8.3 | Presence | A |
| Example 7 | A1 | 58 | B1 | 22 | C2 | 20 | 9.1 | D3 | 30 | 8.4 | Presence | A |
| Comparative Example 1 | A1 | 45 | B1 | 45 | C2 | 10 | 7.5 | D3 | 30 | 8.4 | Absence | B |
| Comparative Example 2 | A1 | 40 | B1 | 50 | C2 | 10 | 7.4 | D3 | 30 | 8.4 | Absence | B |
| Comparative Example 3 | A1 | 35 | B1 | 55 | C2 | 10 | 7.3 | D3 | 30 | 8.4 | Absence | B |
| Comparative Example 4 | A1 | 30 | B1 | 60 | C2 | 10 | 7.2 | D3 | 30 | 8.4 | Absence | B |
| Comparative Example 5 | A3 | 59 | B1 | 40 | C3 | 1 | 8.0 | D3 | 55 | 9.0 | Absence | B |
| Comparative Example 6 | A1 | 65 | B3 | 15 | C2 | 20 | 10.8 | D3 | 60 | 7.5 | Absence | B |
| Comparative Example 7 | A1 | 57 | B1 | 3 | C1 | 40 | 11.0 | D3 | 65 | 7.6 | Absence | B |
| Comparative Example 8 | A1 | 50 | B1 | 5 | C1 | 45 | 10.9 | D3 | 25 | 7.8 | Absence | B |

TABLE 2

| Solvent | SP value $(cal/cm^3)^{1/2}$ |
|---|---|
| n-pentane | 7.0 |
| n-hexane | 7.3 |
| diethyl ether | 7.4 |
| n-octane | 7.6 |
| vinyl chloride | 7.8 |

TABLE 2-continued

| Solvent | SP value $(cal/cm^3)^{1/2}$ |
|---|---|
| cyclohexane | 8.2 |
| isobutyl acetate | 8.3 |
| isopropyl acetate | 8.4 |
| butyl acetate | 8.5 |
| carbon tetrachloride | 8.6 |
| methylpropylketone | 8.7 |
| xylene | 8.8 |
| toluene | 8.9 |
| ethyl acetate | 9.1 |
| benzene | 9.2 |
| methyl ethyl ketone | 9.3 |
| methylene chloride | 9.7 |
| acetone | 9.9 |
| carbon disulfide | 10.0 |
| acetic acid | 10.1 |
| n-hexanol | 10.7 |
| cyclohexanol | 11.4 |

As shown in Table 1, in Examples 1 to 7 to which the present invention is applied, the iron loss ratio was less than 100%, and the magnetic properties were improved.

On the other hand, in Comparative Examples 1 to 4 and 8 in which the SP value of the first phase is outside the range of the present invention, the iron loss ratio was 100% or more.

In Comparative Examples 5 to 7 in which the amount of the second phase is high and the adhesion part does not have a sea-island structure, the iron loss ratio was 100% or more.

From the above results, it was found that according to the laminated core of the present invention, it is possible to suppress iron loss and to improve the magnetic properties of the laminated core.

INDUSTRIAL APPLICABILITY

According to the present invention, it is possible to improve the magnetic properties of the laminated core. Therefore, the industrial applicability is great.

BRIEF DESCRIPTION OF THE REFERENCE SYMBOLS

10 Electric motor
20 Stator
21 Stator core (laminated core)
40 Electrical steel sheet
41 Adhesion part

The invention claimed is:
1. A laminated core comprising:
a plurality of electrical steel sheets which are stacked on each other and of each of which both surfaces are coated with an insulation coating; and
an adhesion part which is provided between the electrical steel sheets adjacent in the stacking direction and adheres the electrical steel sheets to each other,
wherein an adhesive for forming the adhesion part includes a first phase and a second phase,
wherein the adhesion part has a sea-island structure of the first phase which is a sea structure portion and the second phase which is an island structure portion,
wherein the first phase contains an epoxy resin, an acrylic resin, and a curing agent,
wherein the first phase has an SP value of 8.5 to 10.7 $(cal/cm^3)^{1/2}$,
wherein the second phase contains an elastomer,
wherein the second phase has an SP value of 7.5 to 8.4 $(cal/cm^3)^{1/2}$,
wherein an amount of the first phase is 50% by volume or more with respect to a total volume of the adhesion part, and
wherein an amount of the epoxy resin is 50% by volume or more with respect to a total volume of the first phase.
2. The laminated core according to claim 1, wherein a difference between the SP value of the first phase and the SP value of the second phase is 0.1 to 3.0 $(cal/cm^3)^{1/2}$.
3. The laminated core according to claim 2, wherein an amount of the acrylic resin is 5% to 45% by volume with respect to a total volume of the first phase.
4. The laminated core according to claim 1, wherein an amount of the acrylic resin is 5% to 45% by volume with respect to a total volume of the first phase.
5. The laminated core according to claim 1, wherein an amount of the curing agent is 1% to 40% by volume with respect to a total volume of the first phase.
6. The laminated core according to claim 1, wherein the curing agent is a novolac type phenolic resin.
7. The laminated core according to claim 1, which is for a stator.
8. A method of manufacturing the laminated core according to claim 1, comprising:
applying an adhesive that includes a first phase containing an epoxy resin, an acrylic resin, and a curing agent and a second phase containing an elastomer to a surface of an electrical steel sheet;
stacking a plurality of the electrical steel sheets; and
curing the adhesive to form an adhesion part.
9. An electric motor comprising the laminated core according to claim 1.

* * * * *